(12) United States Patent
Walker

(10) Patent No.: US 6,418,539 B1
(45) Date of Patent: *Jul. 9, 2002

(54) CONTINUOUSLY AVAILABLE COMPUTER MEMORY SYSTEMS

(75) Inventor: Mark S. Walker, Los Gatos, CA (US)

(73) Assignee: Compaq Computer Corporation, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/177,232

(22) Filed: Oct. 22, 1998

Related U.S. Application Data

(63) Continuation of application No. 08/756,702, filed on Nov. 26, 1996, now Pat. No. 5,848,230, which is a continuation of application No. 08/449,889, filed on May 25, 1995, now abandoned.

(51) Int. Cl.[7] ................................................. H02H 3/05
(52) U.S. Cl. ................................................. 714/5; 714/7
(58) Field of Search ............................... 714/5, 11, 12, 714/13; 711/7, 6, 5, 114, 119

(56) References Cited

U.S. PATENT DOCUMENTS

| | | | |
|---|---|---|---|
| 4,092,732 A | | 5/1978 | Ouchi ........................ 364/900 |
| 4,761,785 A | | 8/1988 | Clark et al. .................... 371/51 |
| 4,817,035 A | | 3/1989 | Timsit ........................ 364/900 |
| 4,870,643 A | | 9/1989 | Bultman et al. ............ 371/11.1 |
| 4,899,342 A | | 2/1990 | Potter et al. ................ 371/10.1 |
| 4,914,656 A | | 4/1990 | Dunphy et al. ............. 371/10.2 |
| 4,993,030 A | | 2/1991 | Krakauer et al. ........... 371/40.1 |
| 5,148,432 A | | 9/1992 | Gordon et al. .............. 371/10.1 |
| 5,237,658 A | * | 8/1993 | Walker et al. ................. 710/38 |
| 5,255,367 A | * | 10/1993 | Bruckert et al. .............. 714/11 |
| 5,325,363 A | * | 6/1994 | Lui ................................ 714/6 |
| 5,379,417 A | * | 1/1995 | Lui et al. ..................... 713/300 |
| 5,504,882 A | * | 4/1996 | Chai et al. ...................... 714/5 |
| 5,546,535 A | * | 8/1996 | Stallmo et al. ................. 714/9 |
| 5,761,406 A | * | 6/1998 | Kobayashi et al. ........... 714/24 |
| 5,848,230 A | * | 12/1998 | Walker .......................... 714/7 |

FOREIGN PATENT DOCUMENTS

| | | | |
|---|---|---|---|
| EP | 0320107 | 6/1989 | ........... G06F/11/10 |
| WO | WO 89/10594 | 11/1989 | ........... G06F/13/00 |

OTHER PUBLICATIONS

Article by Dimitri Kececioglu, entitled "Reliability Engineering Handbook" published by *Practice Hall*, vol. 1,pp. 74–77.

Article by Chen et al., entilted "Two Papers on RAIDs" published by *Computer Science Division*, Department of Electrical Engineering and Computer Sciences University of California, Berkeley, Report No. UCB/CSD 88/479, ppp. 1–12 (2 sets 24 pgs).

* cited by examiner

*Primary Examiner*—Dieu-Minh Le
(74) *Attorney, Agent, or Firm*—Fenwick & West LLP

(57) ABSTRACT

A highly reliable computer memory storage system that is divided into subsystems, each of which is provided in triplicate: a primary subsystem, a backup subsystem and a spare subsystem. Upon detection of a non-recoverable failure in a primary subsystem, the backup subsystem substantially immediately assumes the tasks of the primary subsystem while the spare subsystem is integrated into the operation of the computer memory storage system. The triple replication of all subsystems and mechanisms for detecting failures in at least the primary and secondary subsystems provides an overall memory system which is highly reliable and substantially never requires servicing. In an alternative embodiment, three subsystems can share a load equally, for example a cooling or power supply load requirement. Upon failure, of any one or two of such three redundant subsystems, the remaining subsystems(s) is built with sufficient extra capacity that remaining subsystem(s) can still supply the total power or cooling requirements of the system.

47 Claims, 5 Drawing Sheets

CONTINUOUSLY AVAILABLE COMPUTER MEMORY SYSTEMS

This application is a continuation of application Ser. No. 08/756,702, filed Nov. 26, 1996, now U.S. Pat. No. 5,848,230 which is a continuation of application Ser. No. 08/449,889, filed May 25, 1995 abandoned.

BACKGROUND OF THE INVENTION

1. Field of the Invention

The present invention relates to reliable electronic systems. More particularly, but without limitation, the present invention relates to highly reliable computer disk drive memory systems, wherein reliability is obtained through the use of redundant components.

2. Description of Related Art

Various types of computer memory storage units are used in data processing systems. A typical system may include one or more disk drives (e.g., magnetic, optical or semiconductor) connected to the system's central processing unit ("CPU") through respective control devices for storing and retrieving data as required by the CPU. A problem exists, however, if one of the subsystems within the storage unit fails such that information contained in the storage unit is no longer available to the system. Such a failure may shut down the entire data processing system.

The prior art has suggested several ways of solving the problem of providing reliable data storage. In systems where data records are relatively small, it is possible to use error correcting codes ("ECC") which are appended to each data record within a storage unit. With such codes, it is possible to correct a small amount of data. However, such codes are generally not suitable for correcting or recreating long records which are in error, and provide no remedy at all for the complete failure of an entire disk drive, for example. Therefore, a need exists for providing data reliability external to individual disk drives.

Redundant disk array systems provide one solution to this problem. Various types of redundant disk array systems exist. In a paper entitled "A Case for Redundant Arrays of Inexpensive Disks (RAID)", Proc. ACM SIGMOD, June 1988, Patterson et al., cataloged a number of different types of disk arrays and defined five distinct array architectures under the acronym "RAID," for Redundant Array of Inexpensive Disks.

A RAID 1 architecture involves the use of duplicate sets of "mirrored" disk drives, i.e., keeping duplicate copies of all data on pairs of disk drives. While such a solution partially solves the reliability problem, it almost doubles the cost of data storage. Also, once one of the mirrored drives fails, the RAID 1 architecture can no longer withstand the failure of a second mirrored disk while still maintaining data availability. Consequently, upon the failure of a disk drive, the RAID 1 user is at risk of losing data.

Such systems as those described above have been designed to be easily serviceable, so as to help minimize the total amount of time required for detecting the failed disk drive, removing and replacing the failed drive, and copying data from the remaining functional disk to the replacement disk to again provide a redundant storage system. Nevertheless, in some circumstances where a customer detecting a failed disk drive must secure the assistance of a service engineer, the time elapsed from detection of the failure to complete data redundancy can be as long as twenty-four hours or more. During all this time, the user is exposed to the possibility of data loss if the sole remaining mirrored disk drive fails.

In an attempt to reduce this "window of vulnerability," some manufacturers have equipped their storage array disk drive products with a spare disk drive. The spare disk drive is not used during normal operation. However, such systems are designed to automatically detect the failure of a disk drive and to automatically replace the failed disk drive with the spare disk drive. As a practical matter, replacement usually occurs by automatically turning off the failed drive and logically replacing the failed drive with the spare drive. For example, the spare drive may be caused to assume the logical bus address of the failed drive. Data from the functioning disk is then copied to the spare disk. Since this automatic failure detection and replacement process can typically be accomplished within a fairly short period of time (on the order of minutes), the window of vulnerability for automated systems is greatly reduced. Such techniques are known in the disk drive industry as "hot sparing."

Immediately following the hot sparing process, the disk array system, although fault tolerant, can no longer sustain two disk failures while maintaining data availability. Therefore, the degree of fault tolerance of the system is compromised until such time as the customer or a service engineer physically removes the failed disk drive and replaces the failed disk drive with an operational disk drive.

As previously mentioned, in addition to RAID 1, there are also RAID levels 2–5. Although there are significant differences between the various RAID levels, each involves the technique of calculating and storing encoded redundancy values, such as hamming codes and parity values, for a group of disks on a bit-per-disk basis. With the use of such redundancy values, a disk array can compensate for the failure of any single disk simply by reading the remaining functioning disks in the redundancy group and calculating what bit values would have to be stored on the failed disk to yield the correct redundancy values. Thus, N+1 RAID (where N=total number of disks containing data in a single redundancy group) can lose data only if there is a second disk failure in the group before the failed disk drive is replaced and the data from the failed drive recreated on the replacement disk.

Redundant disk storage increases overall data availability for data stored on the memory system. However, failure of other parts of the memory system can also compromise data availability. For example, failure of the power, cooling or controller subsystems forming part of the computer memory storage unit may cause stored data to become unavailable.

Redundant power systems are known wherein a single disk array is provided with two power supply subsystems, each being capable of powering the entire array. During normal operation, each power supply supplies one-half of the overall power requirements of the array. However, upon the failure of either power supply, the remaining power supply provides all power to the array until the failed power supply is replaced.

Similarly, redundant cooling systems are also known. For example, two fans may normally cool the entire disk array system. Upon the failure of either fan, the rotational speed of the remaining fan increases so that the remaining fan maintains the temperature of the system within tolerable limits until such time as the defective fan is replaced.

Array Technology Corporation of Boulder Colorado has offered dual controller RAID storage systems to the commercial market. Upon the failure of one of the dual RAID controllers, the host CPU can continue to access data stored on any disk of the array through the other controller. Thus, the Array Technology Corporation disk array system can tolerate the failure of a single controller without compromising data availability.

During recent years, the cost of the physical components for disk drive systems has been decreasing. However, the cost of labor, and in particular the cost for service, is increasing and can be expected to continue to increase. In fact, over the commercially useful life of a disk drive system (typically about 5–10 years), service costs can be expected to meet or exceed the initial purchase price of the system.

Many highly available redundant disk storage systems are designed such that the components which are subject to failure can be easily removed and replaced, either by the customer or a field engineer. Unfortunately, however, building a disk storage system wherein components are serviceable significantly increases the design and manufacturing costs and hence the cost to the customer. For example, serviceable components must be built with more expensive blind mateable plugs and sockets for electrically interconnecting parts wherein such connectors are not easily accessible, for highest availability the overall system must be designed to allow removal and installation of such components without shutting down the system, power interlocks must be installed, etc. It is well known to computer engineers that building such serviceable systems increases the cost of design and manufacture.

In view of the above, it is clear that there exists the need for a computer memory storage unit which has at least the reliability of current highly reliable memory systems, but which, from a commercial standpoint, never needs repair. If the need for repair during the commercially useful life of the product can be eliminated, then the product, even if more expensive to purchase initially, could still provide the customer with a total lower cost of ownership. The present invention fills this need.

SUMMARY OF THE INVENTION

In the commercial disk array storage system arena, relatively high reliability is routinely achieved in all memory subsystems, including data storage, power, cooling, controllers and interfaces. Although highly reliable, components nevertheless do occasionally fail and, as previously mentioned, service costs are increasing and are expected to continue to increase. However, by using: a) redundant and/or spare subsystems; b) automatic fault detection; c) mechanisms for automatically swapping a redundant or spare subsystem for a failed subsystem; and (d) where appropriate, circuits which automatically compensate for the failure of any one of the multiple redundant subsystems, computer disk storage memory units can be manufactured which may be expected (statistically) to experience a failure which renders data unavailable only on the order of about once in one million years. In other words, if one million such disk-based memory units were sold, only one will be expected to fail in such a way as to make data unavailable each year during the commercially useful lifespan of the product. More importantly, the manufacturer can therefore reasonably guarantee its customers with a very high degree of certainty that, during some commercially reasonable period of time, the units simply will not fail and that data stored thereon will be continuously available.

Typical disk drive memory systems can be broken down into several functional subsystems, including a disk subsystem, power subsystem, cooling subsystem and controller subsystem. For present purposes a "functional subsystem" is defined to mean any group of components subject to failure during normal operation and during the commercially anticipated useful lifetime of the overall unit. For example, a disk drive is a functional subsystem subject to failure, whereas the cabinet enclosing the disk drive is not.

From a device standpoint, the present invention achieves the goal of continuously available data by making all functional subsystems of the disk storage system redundant. This includes the provision of backup and spare subsystems for each primary functional subsystem, fault detectors capable of detecting and/or compensating for a failure in either the primary or backup subsystems and, where necessary, circuits for automatically swapping into service one of the two remaining subsystems for a failed one of the redundant subsystems.

From a method standpoint, the present invention includes the steps of providing a storage system (such as a magnetic disk array) including primary functional subsystems, each of which has a backup and spare subsystem. Upon the failure of any primary subsystem, the failure may be detected and, substantially immediately, the backup system takes over the function of the failed primary subsystem. The spare subsystem is then integrated into the overall system to take over the functions of the redundant backup subsystem. Alternatively, or in addition, the invention includes the steps of increasing the output of the remaining functional subsystems to compensate for the failure of any of the primary, backup or spare redundant subsystems.

Disk array controller subsystems direct the storage and retrieval of data to the disks of the disk array and also perform an interface function between the host CPU and the array of disks providing memory to such host CPU. According to the present invention, the controllers are provided in triplicate, i.e., primary, backup and spare controllers. During normal operation, the primary controller directs the writing and reading of data to and from the disk array in the conventional manner. The backup and spare controllers are connected for communication with the host CPU and, upon detection of a failure of the primary controller by the host CPU, the host CPU directs the backup controller to take over the control and interface function. Similarly, upon detection by the host CPU of a failure of the backup controller, the spare controller is directed to assume the array control and interface functions.

Unlike the disk and controller subsystems, which are digital in nature, some systems, such as cooling and power, are analog in nature. According to the present invention, the analog systems are also provided in triplicate (i.e. primary, backup and spare). During operation, these may be used in such a manner that one of the three subsystems provides the entire required function and, upon failure of the primary subsystem, the backup subsystem is swapped in for the primary subsystem and the spare subsystem then takes the place of the backup subsystem.

Alternatively, because of the analog nature of these subsystems, all three power or cooling subsystems may simultaneously share the total load. For example, when all three fans are operational, each provides one-third of the total cooling. Upon the failure of the primary fan, the remaining two fans increase rotational speed so that each provides one-half of the total cooling. Upon a second fan failure, the remaining fan provides all the cooling needs of the system.

Similarly, power supply subsystems can be configured so that each supplies a portion of the total power needs of the computer memory storage unit. Upon the failure of any one or two of the three power supplies, the remaining power supply(s) each supply one-half and then all, respectively, of the total power requirements of the overall memory unit.

The present invention may decrease the total cost of ownership of a computer memory storage unit over the commercial lifetime of the unit. The triple redundancy of all functional subsystems of a disk array system may initially appear to increase cost. However, the present inventor has calculated that, surprisingly, the total cost of ownership of a disk array system can be reduced by the appropriate use of triply redundant components and fault detection and/or compensation circuitry, as described in greater detail hereinafter. The cost savings is achieved and a useful advance in the art realized because the additional costs incurred in integrating triply redundant components into the memory system may be more than offset by the reduction in service calls to customer sites and avoidance of the previously described costs associated with engineering a field-serviceable product.

The above and other advantages of the present invention will become more fully apparent when the following detailed descriptions of the invention are read in conjunction with the accompanying drawings.

BRIEF DESCRIPTION OF THE DRAWINGS

The invention will now be described with reference to the accompanying drawings, wherein.

DETAILED DESCRIPTION OF THE PREFERRED EMBODIMENTS

The following description is of the best presently contemplated modes of carrying out the invention. This description is made for the purpose of illustrating the general principles of the invention and is not to be taken in a limiting sense.

Figure 1:
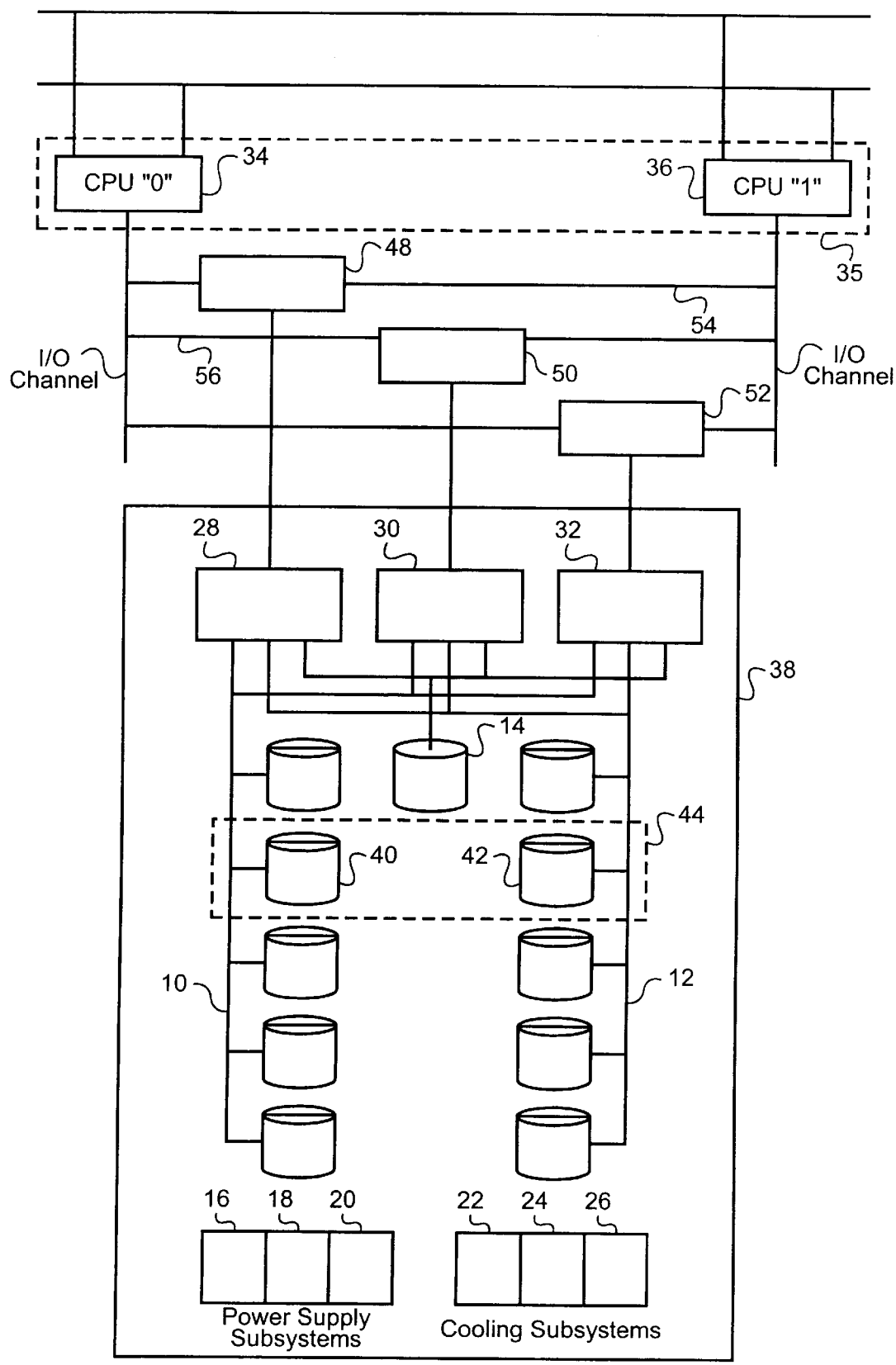
FIG. 1 is a block diagram of a RAID-1-type disk array computer memory data storage unit according to one preferred embodiment of the present invention, wherein data is stored on a primary disk array and completely replicated on a backup or "mirror" array.

FIG. 1 illustrates certain aspects of the present invention embodied in a RAID 1-type disk drive storage system. As shown in this figure, in a continuously available memory storage unit according to the present invention, all functional subsystems include a backup and spare subsystem in addition to the primary subsystem. Specifically, the disk drive subsystem includes an array of primary 10 and backup 12 drives, and at least one spare drive 14. The power supply subsystems (shown in block diagram format) similarly include primary 16, backup 18 and spare 20 power supplies. The cooling subsystems include primary 22, backup 24 and spare 26 fans. FIG. 1 also illustrates primary 28, backup 30 and spare 32 controllers.

A host computer system 35 is shown in FIG. 1 wherein multiple host CPUs 34, 36 may read from or write to the disk storage unit 38. However, the disk storage unit 38 could be used in a less complex single CPU data processing system. In either event, during operation, the host computer 35 initiates read/write operations to the memory unit 38 through the controllers 28, 30, 32. Initially, the host computer 35 interacts with the primary controller 28 which, in turn, completes the read/write operations to the primary disk array 10. Simultaneously, duplicate write operations are conducted with the backup mirror disk array 12 so that a complete duplicate data set is maintained on the system.

When the controller 28 detects a failure of a disk 40 in the primary disk array 10, further read operations are directed to the backup mirrored disk 42 of the mirrored pair 44. Write operations, of course, continue to be made to the mirrored disks 12. Upon detection of a failed one 40 of the primary disks by the primary controller 28, the spare disk 14 is substituted for the failed primary disk 40, data is copied from the corresponding backup disk 42 in the backup array 12 to the spare disk 14 and the spare disk 14 then assumes operations in place of the backup disk 42.

Similarly, upon detection of a failure of the primary controller 28, the duplicate backup controller 30 takes over operations previously performed by the primary controller 28. The host computer 35, comprising CPUs 0 and 1, is programmed to monitor the operational status of the controllers 28, 30, 32. Preferably, three techniques are used. First, so-called "watch dog time outs" are used. Accordingly to this technique, the microprocessor (not shown) within each controller 28, 30, 32 includes a timer; the host computer 35 is programmed to periodically send timer reset signals to the controllers 28, 30, 32. Upon receipt of the reset signals, a properly functioning controller resets its associated timer to zero. If any timer records a certain predetermined elapsed time without being reset, then the associated microprocessor sends a signal to the host computer 35 indicating that that controller has failed. During normal operations, the host computer 35 sends a reset signal to each controller 28, 30, 32 during a period which is shorter than that which will trigger the watchdog signal from the controllers. However, if a controller 28, 30, 32 malfunctions so that it is incapable of receiving and carrying out the reset instruction, then the watchdog time out signal will indicate the failure to the host computer 35.

Cyclical Redundancy Checks ("CRCs") provide a second technique for monitoring the operational status of the controllers 28, 30, 32. In one example of this technique, the host computer 35 periodically transmits data to the storage unit 38. Bits comprising a cyclically redundant value are appended to the data. For example, error detection algorithms such as hamming codes or XOR parity may be used to generate the redundancy values. In any event, the host computer 35 instructs the controller 28 to store the data and redundancy values in its local memory (not shown) and then retransmit the data and redundancy values to the host computer 35. The host computer 35 again applies the CRC algorithms. If the CRC does not yield the expected null value, and no other indications of subsystem failure have been presented, then the host 35 assumes that the controller 28 has failed.

Thirdly, the controller microprocessors may be programmed to run any one or more of the many standard diagnostic tests typically used to detect problems with microprocessor-based computer systems. If any test uncovers a problem with any one of the controllers, that controller transmits an error message to the host 35.

As illustrated in FIG. 1, each of the controllers 28, 30, 32 communicates with the host computer 35 through a tri-state buffer 48, 50, 52. (Each controller subsystem therefore, includes both a controller and an associated tri-state buffer.) If, based upon any one or more of the above-described tests, the host computer 35 determines that a controller, for example controller 28, has failed, then the host computer 35 sends a signal to the tri-state buffer 48 causing it to electrically disconnect that controller 28 from the associated bus 54. The host computer 35 then sets the logical address of the backup controller 30 to the logical address of the failed controller 28. The host 35 accomplishes subsequent read/write operations using the backup controller 30.

Subsequently, upon detection of a failure of the backup controller 30 as a result of diagnostic tests, CRC and/or a watchdog time out signal from the backup controller 30, the host computer 35 electrically disconnects the backup controller 30 from the bus 56 and resumes read/write operations via the spare controller 32 using the same processes described immediately above.

Cooling systems 22, 24, 26 and power systems 16, 18, 20, are also provided in triplicate. Active sensing and control circuits (not shown) may be provided for periodically or continuously sensing the temperature of the storage unit 38 and the functioning status of the power supplies 16, 18, 20. Such control circuits, upon detecting the failure of the primary cooling 22 or power 16 subsystems, switch in a backup subsystem 18, 24, respectively. Upon detection of the failure of the backup subsystem, the spare subsystem takes over the cooling or power supply function.

Figure 2:
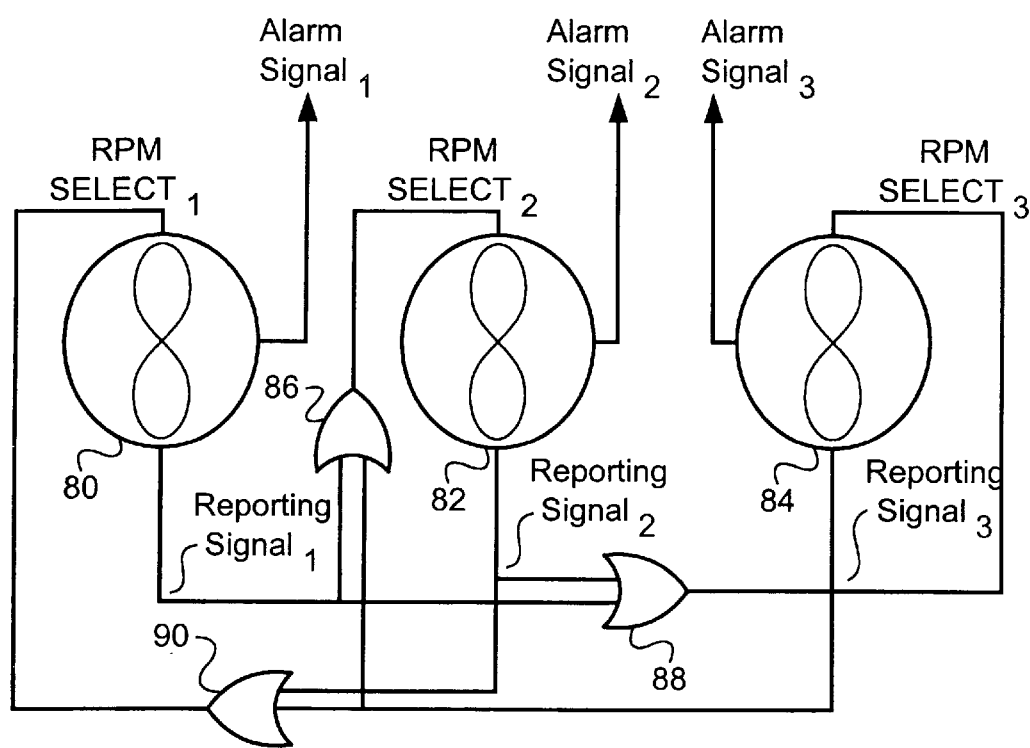
FIG. 2 is a presently preferred circuit diagram for a fault tolerant fan-based cooling subsystem.

As shown in FIG. 2, rotating fans 80, 82, 84 comprise the major components of the presently preferred cooling system for the computer memory unit 38. FIG. 2 illustrates a presently preferred circuit for detecting fan failures and controlling the rotational speed of the fans 80, 82, 84 comprising the cooling subsystems 22, 24, 26. The fans illustrated in this diagram may be conventional two speed fans. The fans utilize three separate signals during operation: (1) RPM select signals; (2) Reporting signals; (3) and Alarm signals. Three fans 80, 82, 84 are provided and the RPM select and Reporting signals are routed between the fans 80, 82, 84 in the manner illustrated in FIG. 2. The alarm signals simply report the failure of any fan to the disk array controllers 28, 30, 32.

In operation, a Hall effect sensor (not shown) is built into each fan 80, 82, 84 to detect its rotational speed. In the illustrated embodiment, high speed may be set at, for example, 3400 RPM, low speed at 2400 RPM and failure at any speed below 1900 RPM. In any particular embodiment, the high, low and failure speeds will, of course, depend upon the design of the memory unit, the cooling capacity of the fans 80, 82, 84 and other parameters. The 3400 RPM, 2400 RPM and 1900 RPM values are merely illustrative.

Initially, when all three fans 80, 82, 84 are operational, each Reporting signal and each RPM select signal is set low (i.e., digital 0). A low (i.e., digital 0) RPM select signal causes each fan 80, 82, 84 to run at low speed. If the speed of a fan drops below 1900 RPM (i.e., the fan fails), then the Reporting signal is set high. A high RPM select signal (i.e., digital 1) switches the fans to high speed.

The OR gates 86, 88, 90 output a 1 if either input is high; otherwise, the OR gates 86, 88, 90 output a zero. Therefore, according to the present invention, when all three fans 80, 82, 84 are operational, each runs at low speed. However, the failure of any one fan cause the remaining two (or remaining one) functioning fan to operate at high speed. Of course, with this presently preferred circuit, any one fan 80, 82, or 84 must have sufficient cooling capacity on high speed to cool the entire memory unit 38.

Figure 3:
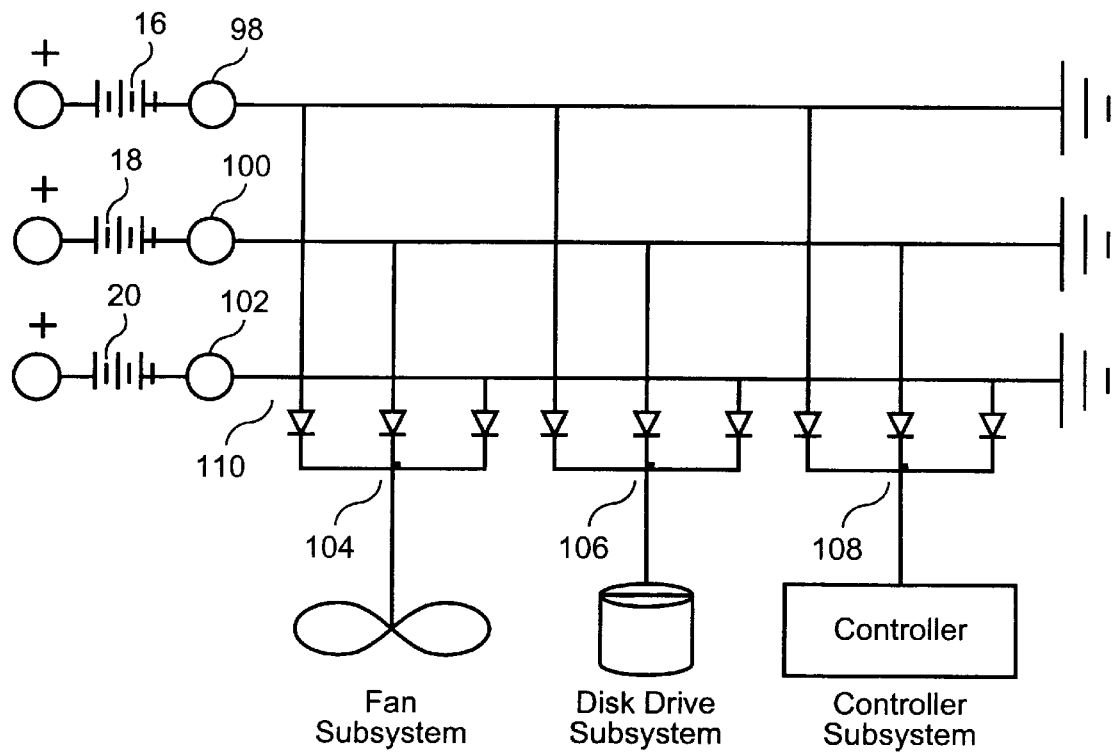
FIG. 3 is a presently preferred circuit diagram for a fault tolerant power supply subsystem.

Preferably, passive load sharing arrangements may be utilized for the power subsystems 16, 18, 20. According to this arrangement, when the primary, 16, backup, 18, and spare, 20, power subsystems are all functional, each supplies one-third of the total power requirements of the system 38. Upon the failure of any one of the three subsystems, the remaining two functioning power supply subsystems each provide one-half of the total power requirements. Upon a second failure, the sole remaining functioning power supply subsystem supplies all of the power requirements for the memory system 38. FIG. 3 illustrates the presently preferred circuit for supplying power to the fan, disk drive and controller subsystems. For simplicity and clarity of illustration, only a single one of each subsystem is shown in FIG. 3. However, in any operational memory unit 38, the power subsystems would be connected to all primary, backup and spare subsystems in the same way.

In the circuit illustrated in FIG. 3, three power supply subsystems 16, 18, 20 jointly provide power to all functional subsystems. The terminals 98, 100, 102 of each power supply 16, 18, 20 are connected to a node 104, 106, 108 forming the power input terminal for each such subsystem. Since the output voltages of each power supply 16, 18, 20 are essentially equal, Ohm's Law requires that during normal operation each of the three power supplies 16, 18, 20 will supply one-third of the total power to each subsystem. Upon the failure of a power supply, for example, supply 16, diode 110 prevents current from power supplies 18 and 20 from flowing in the reverse direction through the failed power supply 16. In effect, the failed power supply 16 becomes electrically isolated from the overall system and each subsystem subsequently draws half of its power requirements from each of the remaining two functioning power supplies, 18, 20.

As will be apparent from the above discussion, failure of a second power supply, for example power supply 18, will result in the sole remaining functioning power supply 20 providing all of the power to all subsystems in the same way and for the same reasons described above with respect to the failure of power supply 16.

Figure 4:
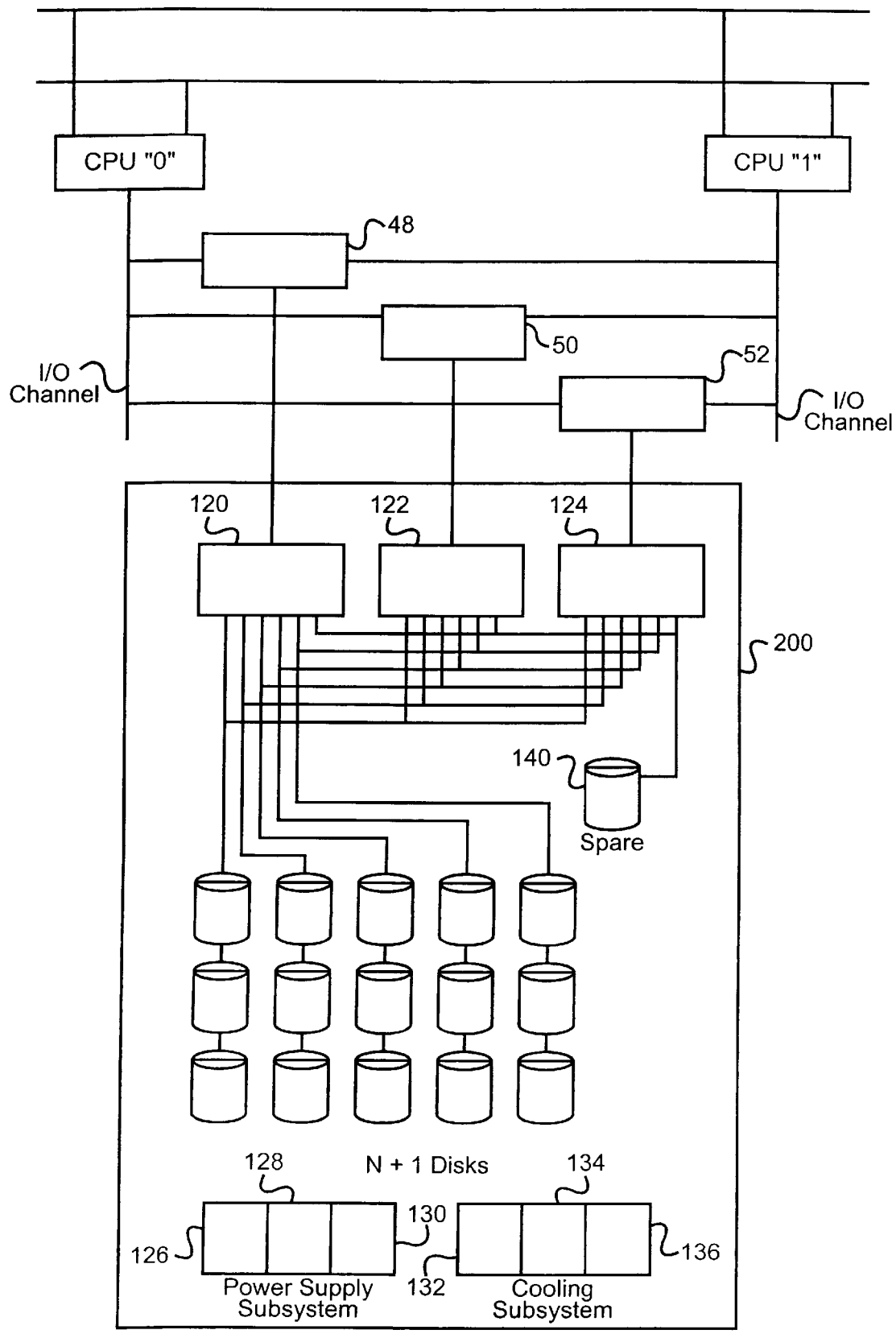
FIG. 4 is a block diagram of a RAID 2–5-type disk array computer data storage unit according to an alternative preferred embodiment of the present invention, wherein data is stored in an N+1 configuration.

FIG. 4 illustrates a continuously available computer disk array architecture that is somewhat similar to the architecture shown in FIG. 1. Like the architecture of FIG. 1, this disk array memory system 200 also includes triply redundant array controllers 120, 122, 124, power subsystems 126, 128, 130 and cooling subsystems 132, 134, 136. However, FIG. 4 illustrates an N+1 RAID 2–5 architecture and, therefore, data redundancy is initially provided by the bit striping schemes that render RAID architectures inherently fault tolerant. Triple redundancy is accomplished in the same manner as in the disk system of FIG. 1, i.e., by the provision of a spare disk 140.

Figure 5:
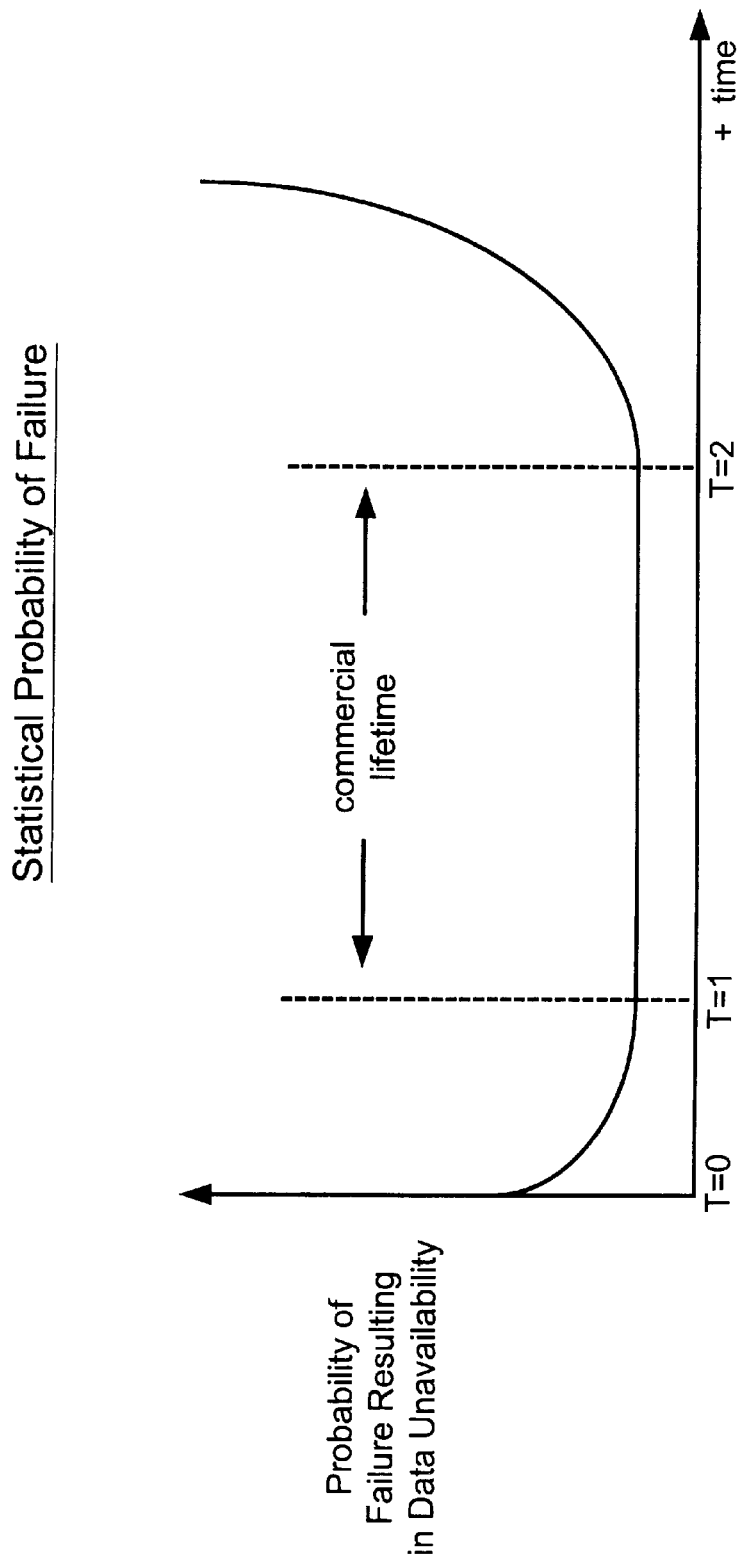
FIG. 5 is a graph illustrating the statistical probability of a failure resulting in data unavailability.

An inherent property of most electronic systems, including the functional subsystems of a disk storage array as described above, is that such storage systems fail according to a well defined statistical probability best defined by the so-called "bath tub curve," illustrated in FIG. 5. This statistical failure characteristic of electronic systems is discussed in detail, for example, in "Reliability Engineering Handbook", Vol. 1, 1991 by Dimitri Kececiogla.

Between time T=0 and T=1 in FIG. 5, there is a statistically increased chance of system failure. This time period occurs when the disk memory system is initially turned on and a certain number of improperly manufactured disk drives or other functional subsystems will fail, for example, those which were not discovered by the manufacturer's quality assurance procedures. By the end of the time period T=1, the improperly manufactured disk drives have failed and, therefore, have been removed from the population of functioning drives. In a particularly preferred procedure for quality assurance, the system manufacturer powers up and "exercises" the completely manufactured systems before shipping to a customer so that systems which would fail during the period prior to T=1 are identified and repaired before shipment. This procedure also helps identify a "bad batch" of components.

Subsequent to T=1, a relatively long period of time elapses wherein there are very few system failures which would render data unavailable. During this period, described as the commercially useful life of the product, a manufacturer can guarantee its customers, with a very high degree of certainty, that the disk drive systems will not fail to a degree wherein data becomes unavailable. In the rare instance where a system does experience such a failure, the manufacturer could then replace the system at no cost to the customer. Similarly, because the likelihood of a failure rendering data unavailable is so low, most customers could risk relying upon the inventive system to maintain data availability, at least between substantially extended periods wherein data stored on the disks may be transferred to archival tape. With a memory system of the present invention constructed from commercially available components, the likelihood of three successive subsystem failures rendering data unavailable during the commercially useful lifetime of the disk storage system is so low that a manufacturer should be able to easily afford to replace the failed systems at no cost to the customers.

Following the time period T=2, components begin to wear out. Naturally, as the systems age beyond their intended commercially useful lifetime, the probability of failure will tend to substantially increase.

To demonstrate the anticipated high reliability of a RAID 1-type disk array memory system during the commercially useful lifetime of a memory unit having 5 mirrored disk pairs and one spare disk, such as that illustrated in FIG. 1, one can assume that the system is composed of commercially available subsystems. Such commercially available subsystems may have the following statistical reliability values:

MTBFd=mean time between failures for a single disk drive=500,000 hours

MTBFp=mean time between failures for a single power supply subsystem=1,500,000 hours MTBFf=mean time between failures for a single fan subsystem=1,500,000 hours MTBFc=mean time between failures for a controller (including tri-state buffer) subsystem=600,000 hours If one further assumes that the time, R, to copy all data from the backup disk to the spare disk upon failure of the primary disk is ½ hour, then the mean time to data unavailability ("MTDU") for such a disk-based computer memory system can be calculated, as follows:

The probability of one disk failure:

$$P_1 = \frac{3}{MTBF_d} = \quad (1)$$

The probability of a second disk failure before the data is reconstructed on the spare disk:

$$P_2 = \frac{R}{MTBF_d} \quad (2)$$

The probability of the second and third disk failures:

$$P_3 = \frac{2}{MTBF_d} \times \frac{1}{MTBF_d} \quad (3)$$

The Mean Time to Data Unavailability ("MTDU") caused solely by the failure of all three disk drives:

$$MTDU_{Disk} = \frac{1}{P_1 P_2 + P_1 P_3} = \frac{1}{\left(\frac{3}{MTBF_d}\right)\left(\frac{R}{MTBF_d} + \frac{2}{MTBF^2}\right)} \quad (4)$$

The MTDU$_{Total}$ of the overall RAID 1 system caused by the failure of any three like-kind subsystems is:

$$\frac{1}{MTDU_{TOTAL}} = \frac{1}{MTDU_{Disk}} + \frac{1}{MTDU_{Power}} + \frac{1}{MTDU_{Fans}} + \frac{1}{MTDU_{Controllers}} \quad (5)$$

(6) Therefore using the assumed values for MTBF of the various subsystems: MTDU$_{Total}$=4.6 million years As previously mentioned, the need to engineer a field serviceable disk drive memory unit will tend to increase its cost. Manufacturers's could generally save time and cost in the design and manufacture of disk drive memory units (as well as other electronic systems) if they could eliminate those elements of the design which make the system serviceable, and in particular those elements of the design which make the system customer serviceable. For present purposes a non-serviceable subsystem is one which requires the use of extraneous tools to remove a subsystem from the disk array memory system for repair and/or replacement. Serviceable subsystems, in contrast, can be removed from the memory system by manipulation of a lock, latch, handle, clip or similar item normally attached to the enclosing cabinet for the system. Because the probability of a combination of failures which would render data unavailable in a disk drive system designed according to the present invention is so low, such systems can be designed in such a way that none of the subsystems are serviceable. In fact, the greater simplicity of a non-serviceable system will actually tend to improve reliability.

In another embodiment of the present invention, only the disk drive subsystems are designed to be serviced. Alternatively, the disk drive systems may be removable with tools for manipulating standard fasteners such as screws, nuts and bolts, while all other subsystems are not removable from the overall system without substantial alteration or destruction of the enclosing cabinet. These latter two embodiments enable a customer to retrieve data stored on the magnetic disks, notwithstanding the total failure of all the disk drive subsystems.

Several preferred embodiments of the present invention have been described. Nevertheless, it will be understood that various modifications may be made without departing from the spirit and scope of the invention. For example, tape drives or other memory media subsystems can be substituted for the exemplary magnetic disks described in detail above. As another example, multiple spare disk drives may be provided in such a memory unit rather than the single spare disk drive illustrated in the attached figures. Furthermore, the basic concept of the present invention, wherein all functional subsystems of a highly reliable electronic system are provided in triplicate, including primary, backup and spare subsystems, with fault detection and the ability to swap a redundant component for a failed component and/or compensate for a failed component, could be applied to complex electronic systems other than computer memory systems when high reliability and continuous availability are required. Thus, the present invention is not limited to the preferred embodiments described herein, but may be altered in a variety of ways which will be apparent to persons skilled in the art.

What is claimed is:

1. A memory system configurable for attachment to a host computer, comprising:

first, second and third data storage subsystems;

first, second and third controller subsystems, each operatively coupled to the first, second and third data storage subsystems for effecting operations to the storage subsystems; and first and second power supply subsystems, each operatively coupled to all of the storage subsystems and the controller subsystems to supply power to the subsystems, wherein the controller subsystems are configured such that, upon a failure of one of the three controller subsystems, another one of the three controller subsystems takes control of operations to the three storage systems, and upon a failure of said another one of the three controller subsystems, a remaining one of the three controller subsystems takes control of operations to the three storage subsystems.

2. The memory system of claim 1, further comprising circuitry, operatively coupled to the first and second power supply subsystems, for altering the operation of at least one of the power supply subsystems to compensate for the failure of another one of the power supply subsystems.

3. The computer memory system of claim 1, wherein the first, second and third data storage subsystems include redundant data storage devices and at least one spare storage device and further wherein the controller subsystems are programmed to cause the at least one spare storage device to assume the storage functions of a redundant data storage device.

4. The computer memory system of claim 1, wherein all of the subsystems are non-serviceable.

5. The computer memory system of claim 1, wherein the data storage subsystems are serviceable and all the other subsystems are non-serviceable.

6. The computer memory system of claim 1, further comprising an electrical isolation device operatively coupled to each controller subsystem and receptive to instructions, wherein upon receipt of an isolation instruction the receiving isolation device electrically isolates the associated controller subsystem from communication with the host computer.

7. The computer memory system of claim 1, wherein the data storage subsystems include magnetic disk drives.

8. The memory system of claim 1, wherein the data storage subsystems include disk drives.

9. The memory system of claim 1, further comprising at least one cooling subsystem disposed to cool the memory system.

10. The memory system of claim 1, wherein the operations include read/write operations.

11. The memory system of claim 1, wherein the operations include read only operations.

12. The memory system of claim 1, wherein the operations include write only operations.

13. A memory system configurable for attachment to a host computer, comprising:

a redundant data storage subsystem;

a spare data storage subsystem;

first, second and third controller subsystems, each operatively coupled to the redundant data storage subsystem and to the spare data storage subsystem for effecting operations to the storage subsystems; and first and second power supply subsystems, each coupled to all of the data storage subsystems and the controller subsystems to supply power to the subsystems, wherein the controller subsystems are configured such that, upon a failure of one of the three controller subsystems, another one of the three controller subsystems takes control of operations to the three storage systems, and upon a failure of said another one of the three controller subsystems, a remaining one of the three controller subsystems takes control of operations to the three storage subsystems.

14. The computer memory system of claim 13, wherein the redundant data storage subsystem includes a plurality of storage devices operative as a RAID storage system.

15. The computer memory system of claim 13, wherein the redundant data storage subsystem and the spare data storage subsystem include magnetic disk drives.

16. The memory system of claim 13, comprising circuitry, operatively coupled to the first and second power supply subsystems, for altering the operation of at least one of the power supply subsystems to compensate for the failure of another one of the power supply subsystems.

17. The computer memory system of claim 13, wherein the redundant data storage subsystem and the spare data storage subsystem include redundant data storage devices and at least one spare data storage device and further wherein the controller subsystems are programmed to cause at least one spare data storage device to assume the storage functions of a redundant data storage device.

18. The computer memory system of claim 13, wherein all of the subsystems are non-serviceable.

19. The computer memory system of claim 13, wherein the data storage subsystems are serviceable and all of the other subsystems are non-serviceable.

20. The computer memory system of claim 13, further comprising an electrical isolation device operatively coupled to each controller subsystem and receptive to instructions, wherein upon receipt of an isolation instruction the receiving isolation device electrically isolates the associated controller subsystem from communication with the host computer.

21. The memory system of claim 13, wherein the data storage subsystems include disk drives.

22. The memory system of claim 13, further comprising at least one cooling subsystem disposed to cool the memory system.

23. The memory system of claim 13, wherein the operations include read/write operations.

24. The memory system of claim 13, wherein the operations include read only operations.

25. The memory system of claim 13, wherein the operations include write only operations.

26. A method for operating a memory system for a host computer, wherein the memory system includes redundant data storage subsystems, at least one spare data storage subsystem, and first, second and third controller subsystems, first and second power supply subsystems, the method comprising the steps of:

a. initially operating the memory system under control of the first controller subsystem;
b. detecting a failure in the first controller subsystem;
c. disabling effective communication between the first controller subsystem and the host;
d. continuing further communication between the host computer and the second controller subsystem, wherein the memory system is operated under the control of the second controller subsystem;
e. detecting a failure in the second controller subsystem;
f. disabling effective communication between the second controller subsystem and the host computer; and
g. continuing further communication between the host computer and the third controller subsystem, wherein the memory system is operated under control of the third controller subsystem.

27. The computer memory system of claim 26, wherein all of the subsystems are non-serviceable.

28. The method of claim 26, wherein the data storage subsystems are serviceable and all the other subsystems are non-serviceable.

29. The method of claim 26, wherein the data storage subsystems include magnetic disks.

30. The memory system of claim 26, wherein the data storage subsystems include disk drives.

31. The method of claim 26, further comprising at least one cooling subsystem disposed to cool the memory system.

32. A computer memory system, comprising:

first, second and third means for storing data;
first, second and third means for controlling, each operatively coupled to the first, second and third means for storing data, for effecting operations to the means for storing data; and
first and second means for supplying power, each operatively coupled to all of the means for storing data and the means for controlling, wherein the means for controlling are configured such that, upon a failure of one of the means for controlling, another one of the means for controlling will take control of operations to the three means for storing data, and upon a failure of said another one of the three means for controlling, a remaining one of the three means for controlling will take control of operations to the three means for storing data.

33. The memory system of claim 32, wherein all of the means for storing data, the means for controlling and the means for supplying power are non-serviceable.

34. The memory system of claim 32, wherein the means for storing data are serviceable and all of the other means for controlling and the means for supplying power are non-serviceable.

35. A computer memory system, comprising:

a means for providing redundant data storage;
a means for providing spare data storage;
first, second and third means for controlling subsystems, each operatively coupled to the means for providing redundant data storage and to the means for providing spare data storage for effecting operations to the means for providing data storage; and
first and second means for supplying power, each coupled to all of the means for providing data storage and the means for controlling subsystems to supply power to the means for providing data storage and the means for controlling subsystems, wherein upon a failure of one of the three controller subsystems, another one of the three controller subsystems takes control of operations to the three storage systems, and upon a failure of said another one of the three controller subsystems, a remaining one of the three controller subsystems takes control of operations to the three storage subsystems.

36. A method for implementing a memory system configurable for attachment to a host computer, comprising:

storing data via first, second and third data storage subsystems;
effecting operations to the storage subsystems by operatively coupling the first, second and third controller subsystems to the first, second and third data storage subsystems; and
supplying power to the subsystems by operatively coupling first and second power supply subsystems to all of the storage subsystems and the controller subsystems, wherein the controller subsystems are configured such that, upon a failure of one of the three controller subsystems, another one of the three controller subsystems takes control of operations to the three storage systems and upon a failure of said another one of the three controller subsystems, a remaining one of the three controller subsystems takes control of operations to the three storage subsystems.

37. The method of claim 36, wherein the data storage subsystems include disk drives.

38. The method of claim 36 further comprising the step of cooling the memory system via at least one cooling subsystem.

39. The method of claim 36, wherein the operations include read/write operations.

40. The method of claim 36, wherein the operations include read only operations.

41. The method of claim 36, wherein the operations include write only operations.

42. A computer program product, comprising:

a computer usable medium having computer code embodied therein for causing implementing a memory system configurable for attachment to a host computer, the computer program product comprising:
computer readable program code devices configured to cause a computer to effect storing data via first, second and third data storage subsystems;
computer readable program code devices configured to cause a computer to effect operations to the storage subsystems by operatively coupling the first, second and third controller subsystems to the first, second and third data storage subsystems; and
computer readable program code devices configured to cause a computer to effect supplying power to the subsystems by operatively coupling first and second power supply subsystems to all of the storage subsystems and the controller subsystems, wherein the controller subsystems are configured such that, upon a failure of one of the three controller subsystems, another one of the three controller subsystems takes control of operations to the three storage systems, and upon a failure of said another one of the three controller subsystems, a remaining one of the three controller subsystems takes control of operations to the three storage subsystems.

43. The computer program product of claim 42, wherein the data storage subsystems include disk drives.

44. The computer program product of claim 42, further comprising computer readable program devices configured to cause cooling the memory system via at least one cooling subsystem.

45. The computer program product of claim 42, wherein the operations include read/write operations.

46. The computer program product of claim 42, wherein the operations include read only operations.

47. The computer program product of claim 42, wherein the operations include write only operations.

* * * * *